Dec. 13, 1960    J. ZALKIND    2,964,224
DEVICES FOR SEPARATING AND SORTING MANIFOLD SETS
Filed May 18, 1956
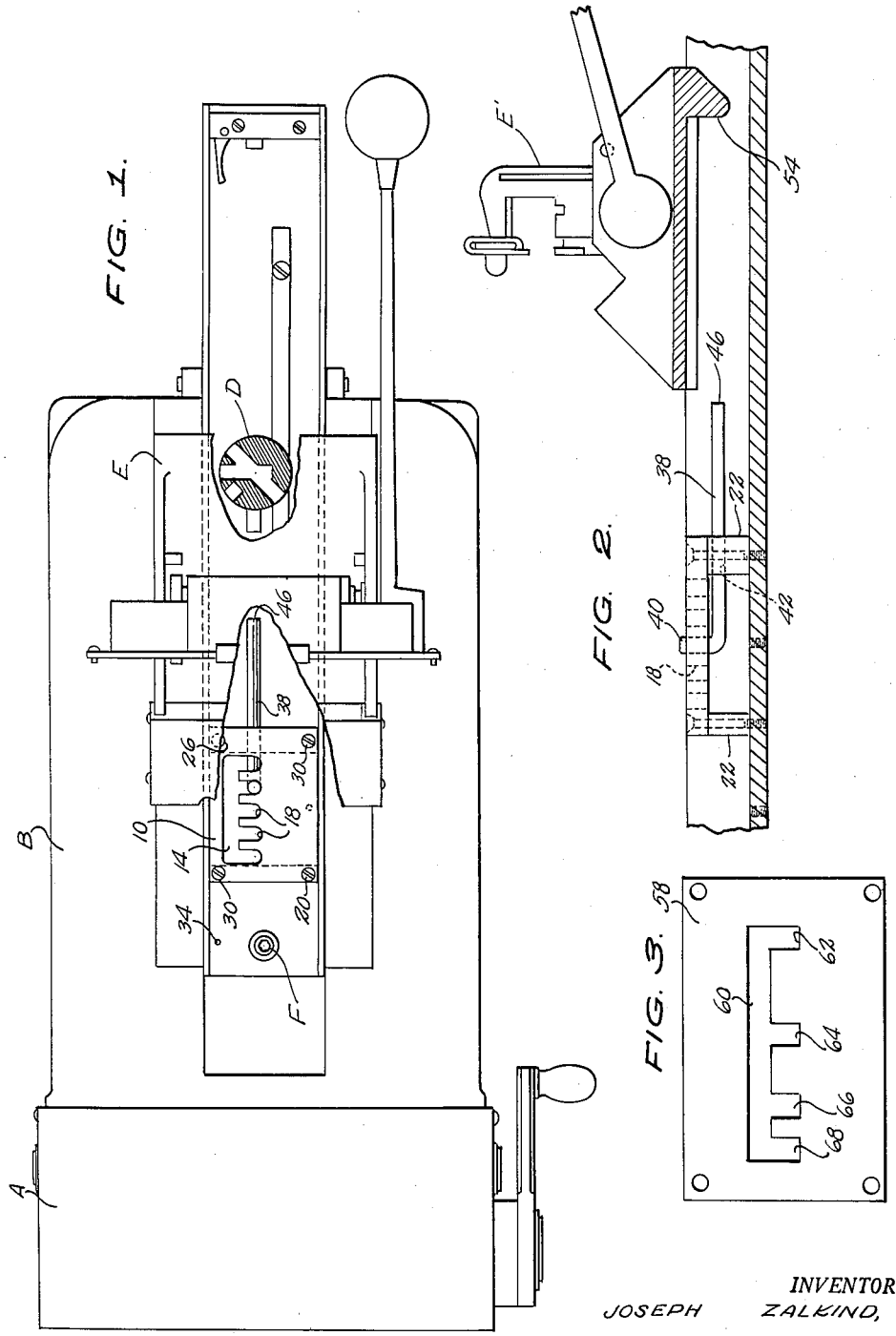
INVENTOR.
JOSEPH ZALKIND,
BY
Albert M. Zalkind
ATTORNEY.

United States Patent Office 2,964,224
Patented Dec. 13, 1960

2,964,224

DEVICES FOR SEPARATING AND SORTING MANIFOLD SETS

Joseph Zalkind, 22 W. 22nd, New York, N.Y.

Filed May 18, 1956, Ser. No. 585,636

2 Claims. (Cl. 225—101)

This invention relates to machines for simultaneously separating and sorting the leaves of manifold sets.

A machine for the described purpose is shown in my co-pending patent application S.N. 541,348, filed October 19, 1955, now Patent No. 2,915,234, comprising a slidable clamp which is positioned at successively differing places to grip stepped margins of the leaves of manifold forms.

The present invention constitutes a modification of the means for positioning the clamp.

In the prior application successive positioning of the clamp was provided by means of a threaded bolt held in adjusted position by nuts, which bolt could be varied in position with respect to a cam carried by the clamp, the end of the bolt abutting the cam at various points to place the clamp at certain predetermined positions corresponding to the stepped sheet margins. The present invention discloses a simplified arrangement for achieving the positioning effect.

It is an object of the invention to provide a simple and rugged means for use in a machine of the class described wherein certain components of the machine may be readily adjusted so as to adapt it for separating and sorting of manifold sets of different sizes.

It is another object of the invention to provide a simplified arrangement for positioning the slidable clamp of a machine of the class described so as to grip successive margins of the sheets of a stack of manifold sets for simultaneous separating and sorting.

The above objects are achieved by means of a slotted plate which can be attached to the machine and which co-acts with a manually adjustable rod that serves as a stop for the slidable carriage. Thus, by adjusting the rod so as to engage a selected slot the travel of the slidable clamp is determined. The basic principle of using a slotted plate is applicable either to automatic setting or positioning of the slidable clamp or to manual positioning thereof. In the first instance where automatic positioning is used, the slidable plate controls the maximum travel of the clamp so as to effectively adjust the machine for various sizes of manifold sets wherein the leaves of the set are stepped so as to be successively gripped by the clamp. On the other hand, where non-automatic positioning of the clamp in a more economical version of the invention is desired, the slotted plate serves to position a rod at each successive motion of the clamp to sequentially grip the extended and stepped margins of a series of leaves of manifold sets.

My invention will now be described in conjunction with the appended drawing, in which:

Fig. 1 is a plan view of the essential elements of the machine as disclosed in my prior application including the novel element described in this patent application.

Fig. 2 is a section in elevation through a more economical version of a machine than that shown in Fig. 1, wherein the successive movements of the slidable clamp are manually predetermined rather than being automatically predetermined.

Fig. 3 shows a modification of a slotted plate which is usable in a machine of the kind described in accordance with the principles disclosed herein.

Referring now to the drawing, particularly Fig. 1, a stationary clamp A is shown carried by a base B to which is secured a channel C. This combination is fully disclosed and described in detail in my co-pending application together with a cam element D positioned in the channel and carried by a slidable clamp E. In view of the fact that the elements A through E are all identical with those set forth in my co-pending application there is no necessity for detailed description herein save to say that the channel C is relatively immovably secured as by the set screw F to the base B.

The cam D being a component of the slidable clamp E is provided with various bores and channels precisely as set forth in the co-pending application. In the prior disclosure, however, the bores and channels co-act with the end of an adjustable threaded member (not shown herein) to position the slidable clamp at successively differing distances with respect to the stationary clamp A so as to sequentially grip the stepped margins of a series of manifold forms. In the present invention the threaded member is eliminated and substitution therefore is made by means of a plate 10 having a longitudinal slot 14 from which extend a plurality of transverse slots 18. The plate is bolted to a pair of spacers 22 as shown in Fig. 2; for example, by the diagonally disposed bolts 26, the spacer 22 being bolted as by diagonally disposed bolts 30 to the bottom of the channel C. Various adjustable positioning holes such as 34 are provided in the bottom of the channel C, whereby plate 10 being supported on the spacers 22, may be fastened in the channel to take care of various sizes of manifold sets beyond the adjustment provided by slots 18 for the particular position of the plate as shown.

Co-acting with the slotted plate is a rod 38 of generally horizontal disposition slidably supported in a bore 42 in the right hand spacer 22. The rod has a bent-up portion 40 which, as best seen in Fig. 1, can lock in any of the transverse slots 18. Thus, by rotating the rod the bent-up end 40 can be slipped out of any slot 18 so that end 40 can traverse slot 14 to be aligned with any desired slot 18 whereupon reverse rotation of the rod serves to lock the end 40 in that slot. The extremity 46 of the rod is positioned to be abutted by cam D as clamp E is pushed toward clamp A.

Thus, as the clamp E is slid back and forth the cam D will be rotated in the manner taught in my prior application and will co-act with the end 46 to position the slidable clamp in various successively closer positions to the manifold stack gripped in stationary clamp A so as to successively seize and separate corresponding sheets of a plurality of manifold sets. The co-action therefore of the cam D with the end 46 is precisely as disclosed in detail in my prior patent application except for the fact that element 38 is novel herein as compared with the threadedly adjustable element of the prior application.

It will be apparent from the foregoing that various sizes of manifold sheets may be accommodated in the machine by virtue of the co-action between the rod 38 and the slotted plate 10. Thus, whenever it is desired to operate the machine with a particular size of manifold set it is merely necessary to adjust the rod 38 into a slot 18 corresponding to the size of manifold sheets to be operated on. Thereafter the functioning of the machine takes place precisely in the manner disclosed in my prior application. Where a great variation in size is required, plate 10 may be repositioned by virtue of the threaded aperture 34. In such case a range of sizes varying according to the spacings between slots 18 may be accommodated in the new position of plate 10.

With reference to Fig. 2, a more economical version of the machine is disclosed in that the slidable clamp E' does not have an automatically actuated cam. Instead, it has a simple abutment 54 which can abut the end 46 of rod 38. In this instance each time a set of sheets is pulled it is necessary to rotate the rod 38 to unlocking position and slide the end 40 into the next successive notch 18. For example, for four-part forms to be separated and sorted it is necessary to move the rod 38 into four different notches so as to bring this slidable clamp E' up a distance equivalent to the length of each extending margin of the plurality of leaves which go to make up a set.

With reference to Fig. 3 a modification of the slotted plate is disclosed. Thus, a plate 58 is disclosed having a longitudinal slot 60 and a series of transverse slots 62, 64, 66, and 68. It will be noted that the spacing between the slots varies. This variation in spacing is to accommodate unusual dimensional combinations of leaves in manifold sets. Thus, certain leaves may be considerably longer than other leaves. In that case, the distance between the slots 62 and 64 is utilized to properly position the slidable clamp to grip the longest leaf. On the other hand, the distance between slots 64 and 66 is seen to be somewhat less than the first-mentioned distance and accordingly it will be understood that this is an appropriate distance to position the slidable clamp to grip the next leaf. Thus, it will be apparent that the inherent concept of the invention may be usable to provide utility of the machine with a wide variety of various types of manifold sets having differing leaf-lengths.

Having described my invention I am aware that various changes may be made without departing from the spirit thereof and accordingly I do not seek to be limited to the precise illustration herein given except as set forth in the appended claims.

I claim:

1. In a sheet separating machine of the class described, a stationary clamp, a movable clamp carrying an abutment means, and means for selectively positioning said movable clamp relative to said stationary clamp comprising a stationary plate intermediate said clamps, said plate having aperture means selectively spaced intermediate said clamps, and an abutment member having a first end selectively engageable with said aperture means so as to be positioned thereby and a second end engageable with said abutment means, wherein said aperture means comprises an elongated slot and a plurality of slots extending therefrom, said plurality of slots being spaced from each other by distances corresponding to the differences in length of sheets to be separated.

2. In a sheet separating machine of the class described, a stationary clamp, a movable clamp carrying an abutment means, and means for selectively positioning said movable clamp relative said stationary clamp comprising a stationary plate intermediate said clamps, said plate having aperture means selectively spaced intermediate said clamps, and an abutment member having a first end selectively engageable with said aperture means so as to be positioned thereby and a second end engageable with said abutment means, wherein said aperture means comprises an elongated slot and a plurality of slots extending therefrom, said abutment member comprising a rod wherein said first end comprises a portion bent away from the main body thereof and protruding into said aperture means, including means for slidably supporting said main body portion, said main body portion being rotative in said support means, whereby said first end may traverse said elongated slot to position said second end with respect to said stationary clamp and whereby said rod may be rotated to lock said first end in a selected transverse slot.

References Cited in the file of this patent

UNITED STATES PATENTS

| | | |
|---|---|---|
| Re. 21,795 | Verderber | May 26, 1941 |
| 299,911 | Cooper | June 3, 1884 |
| 2,362,275 | Jacobs | Nov. 7, 1944 |
| 2,579,835 | Lather | Dec. 25, 1951 |
| 2,730,174 | Weinstein | Jan. 10, 1956 |